United States Patent
Gill (10) Patent No.: US 8,049,950 B2
(45) Date of Patent: Nov. 1, 2011

(54) TUNABLE ZERO-CHIRP PULSE GENERATOR USING PLASMA DISPERSION PHASE MODULATOR

(75) Inventor: Douglas M Gill, South Orange, NJ (US)

(73) Assignee: Alcatel Lucent, Paris (FR)

( * ) Notice: Subject to any disclaimer, the term of this patent is extended or adjusted under 35 U.S.C. 154(b) by 212 days.

(21) Appl. No.: 12/351,282

(22) Filed: Jan. 9, 2009

(65) Prior Publication Data
US 2010/0177373 A1 Jul. 15, 2010

(51) Int. Cl.
*G02F 1/01* (2006.01)
(52) U.S. Cl. ........................................ 359/279
(58) Field of Classification Search ............... 359/279, 359/245, 246, 237
See application file for complete search history.

(56) References Cited

U.S. PATENT DOCUMENTS

| | | | | |
|---|---|---|---|---|
| 6,760,142 B2 * | 7/2004 | Leuthold et al. | ............... | 359/279 |
| 7,002,724 B2 * | 2/2006 | Gill et al. | ................ | 359/279 |
| 7,099,359 B2 * | 8/2006 | Griffin | ................ | 372/26 |
| 7,369,714 B2 * | 5/2008 | Gan et al. | ................ | 385/2 |
| 7,542,686 B2 * | 6/2009 | Madsen et al. | ................ | 398/208 |

* cited by examiner

*Primary Examiner* — Ricky Mack
*Assistant Examiner* — Vipin Patel
(74) *Attorney, Agent, or Firm* — Brosemar, Kolefas & Assoc.

(57) ABSTRACT

An optical pulse generator comprising a phase modulator, wherein the phase modulator is configured to phase modulate and intensity modulate a continuous wave (CW) light signal in accordance with a received electrical signal, and an all-pass filter, the all-pass filter being coupled to the phase modulator to generate a pulsed light signal by filtering the modulated light signal from the phase modulator.

14 Claims, 9 Drawing Sheets

TUNABLE ZERO-CHIRP PULSE GENERATOR USING PLASMA DISPERSION PHASE MODULATOR

FIELD OF THE INVENTION

The present invention relates to the field of optical signal processing, and more specifically to apparatus and methods related to optical signal modulation.

BACKGROUND INFORMATION

Silicon photonics has the potential to change many aspects of data transport, but has not yet substantially impacted long haul transport. Part of the reason for this is that modulators in this platform are "chirped" in the sense that they generate signals that exhibit chirp. As is well known, chirp can degrade spectral efficiency and long haul transport characteristics.

In silicon and indium phosphide (InP) photonic integrated circuits, electro-optic modulators can create optical phase shifting by using the Kramers-Kronig effect, where a change in optical loss induces a change in optical path length within an optical waveguide. This approach is effective in creating an electro-optic response, often referred to as the plasma-dispersion effect, in materials that do not have an intrinsic electro-optic response. When used for optical modulation within a push-pull Mach-Zehnder modulator (MZM), however, there is a resulting change in modulator optical path length during signal modulation that results in a chirped transmission signal. As mentioned, modulator chirp can be detrimental to system spectral efficiency, system scalability, and transmission performance.

SUMMARY OF THE INVENTION

An exemplary embodiment of a substantially chirp-free pulse generator in accordance with the present invention combines a plasma dispersion phase modulator (PDPM) and an all-pass filter (APF). The substantially chirp-free pulse train can be used with a chirped intensity modulator to generate an effectively chirp-free return-to-zero (RZ) transmission. The RZ transmission can be effectively chirp-free because the optical frequency shifts that result from the modulator chirp can be confined to the regions between the pulses in the pulse train.

Furthermore, various embodiments for generating a substantially chirp-free pulse train can be extremely efficient because the resulting pulse train peak power can be larger than the continuous wave (CW) power input into the pulse generator.

Various embodiments make it possible to generate an effectively chirp-free RZ transmission from an integrated optic platform that typically provides chirped modulation. Effectively chirp-free RZ transmission can be achieved when it previously was typically not possible in a silicon photonic based platform. By creating a chirp free transmission capability for the silicon photonics platform, new applications may be opened up for this technology.

Furthermore, electro-absorption modulator (EAM) designs in accordance with various embodiments can also be used in a platform such as indium phosphide (InP) to generate effectively chirp-free transmissions, opening up new opportunities to optimise power consumption and use of space with this technology platform.

The aforementioned and other features and aspects of various embodiments are described in greater detail below.

DETAILED DESCRIPTION

Figure 1:
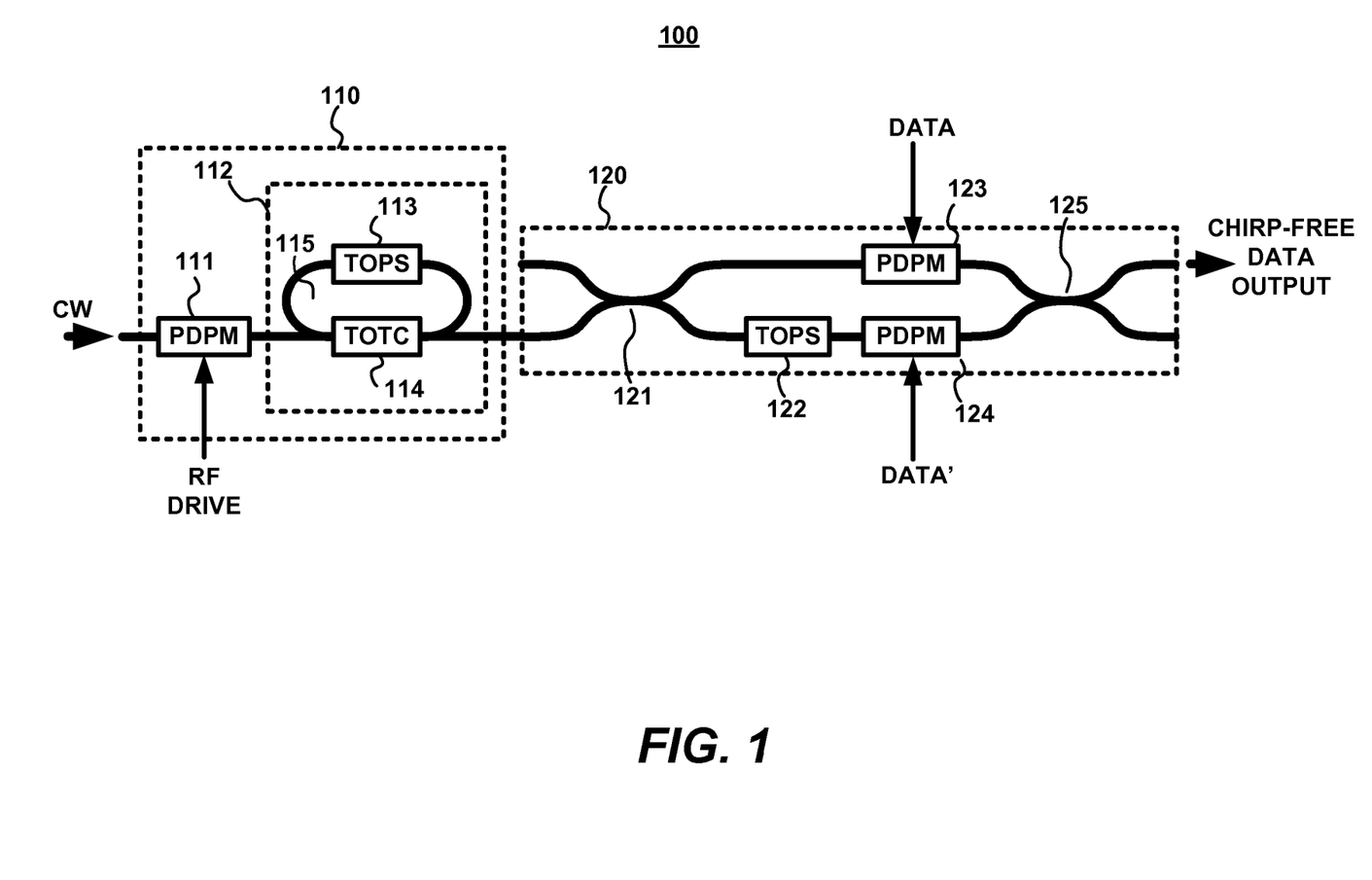
FIG. 1 is a schematic representation of an exemplary embodiment of an effectively chirp-free data modulator system in accordance with the present invention.

FIG. 1 is a block diagram of an exemplary embodiment of a data modulator system 100 in accordance with the present invention. The system 100 comprises an exemplary embodiment of an optical pulse generator 110 coupled to an optical modulator 120. The pulse generator 110 comprises a high-speed plasma-dispersion phase modulator (PDPM) 111 coupled to an all-pass filter (APF) 112. The APF 112 comprises a thermo-optic phase shifter (TOPS) 113 and a thermo-optic tunable coupler (TOTC) 114 arranged within a waveguide ring resonator 115. A substantially monochromatic continuous wave (CW) light signal is applied via optical waveguide to the PDPM 111 and is predominantly phase modulated thereby. As shown below, the PDPM 111 also imparts some intensity modulation to the CW light signal.

As described in greater detail below, the pulse generator 110 can generate a pulse train that is substantially chirp-free (e.g., having a chirp factor $\leq \pm 0.2$), even though it is implemented using fabrication technologies, such as silicon, germanium, or indium phosphide (InP) based technologies, that are susceptible to generating chirped signals. Moreover, the pulse generator 110 can be used in conjunction with a modulator which is also implemented using such technology to generate a data-modulated output that is effectively chirp-free. In addition, for applications in which some chirp is desired, the pulse train generator 110 can be tuned to provide variable degrees of chirp. These features are described in greater detail below.

The PDPM 111 creates the required spectral content for a high quality pulse stream. The APF 112 modifies the relative phases of the output tones from the modulator 111 to turn the predominantly phase-modulated light into a substantially chirp-free pulse stream. It should be noted that the peak output pulse power can be larger than the CW power in the waveguide prior to the PDPM 111, even after accounting for the optical loss in the PDPM 111 due to carrier absorption.

The spectral response of the APF 112 can be tuned using the TOPS 113; i.e., by adjusting the phase shift introduced by the TOPS by controlling the temperature of the TOPS in a conventional way. Referring to FIG. 3B, the TOPS 113 controls the spectral positions of the dips (or resonances) in the APF transmission characteristic. The depths or heights of the transmission dips (or resonances) can be controlled using the TOTC 114; i.e., by adjusting the coupling provided by the TOTC by controlling the temperature of the TOTC in a conventional way. As described below, changing the spectral response of the APF 112 can provide variable degrees of positive as well as negative chirp, thereby allowing control over the compression or expansion of pulses as they propagate over fiber.

The frequency of the pulse train generated by the pulse generator 110 is determined by the drive signal applied to the PDPM 111. In an exemplary embodiment, the PDPM 111 is driven by a 10 GHz RF drive signal and the APF 112 has a free spectral range (FSR) of 20 GHz. FIGS. 2-7 described below pertain to a 10 GHz embodiment. Note that while a 10 GHz implementation is described, the present invention is not limited to any particular pulse frequency and may be implemented for a wide range of pulse frequencies well below 10 GHz and extending well beyond 100 GHz.

The modulator 120 encodes data onto the pulse stream generated by the substantially chirp-free pulse generator 110 to generate an effectively chirp-free return-to-zero (RZ) data-modulated output. The RZ output can be effectively chirp-free because the optical frequency shifts that result from the modulator chirp can be confined to the regions between the pulses in the pulse train. Such effectively chirp-free operation can be achieved with a variety of are chirped intensity modulators including, for example, Mach-Zehnder modulators (MZM), electro-absorption modulators (EAM), and optical modulators implemented in silicon photonics structures or indium phosphide (InP). Such modulators are referred to herein as chirped intensity modulators in that they introduce intensity modulation and phase shifting of the modulated signal.

In the embodiment shown in FIG. 1, the modulator 120 comprises a 50/50 coupler 121, with a first output coupled to a TOPS 122 in series with a PDPM 124, and a second output coupled to a PDPM 123. (Note, however, that the coupling ratio of the coupler 121 may be something other than 50/50, so that the modulator can produce a large modulation extinction ratio even though there may be a difference in optical propagation loss between the two arms of the modulator.) The PDPMs 123 and 124 are driven by complementary data signals. The outputs of the PDPMs 123 and 124 are coupled to a further coupler 125, an output of which generates the aforementioned effectively chirp-free RZ data-modulated output.

Figure 2A:
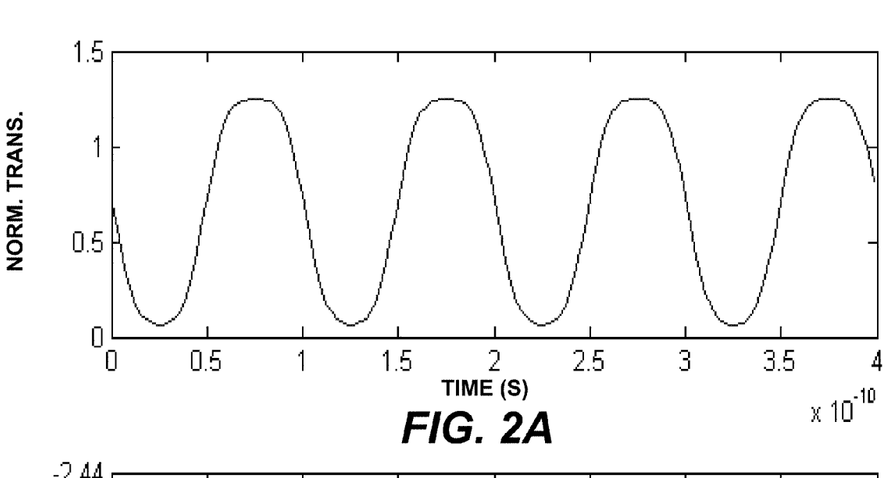
FIGS. 2A and 2B show the amplitude and phase, respectively, of a pulse train generated by an exemplary embodiment of a substantially chirp-free pulse generator in accordance with the present invention.
Figure 2B:
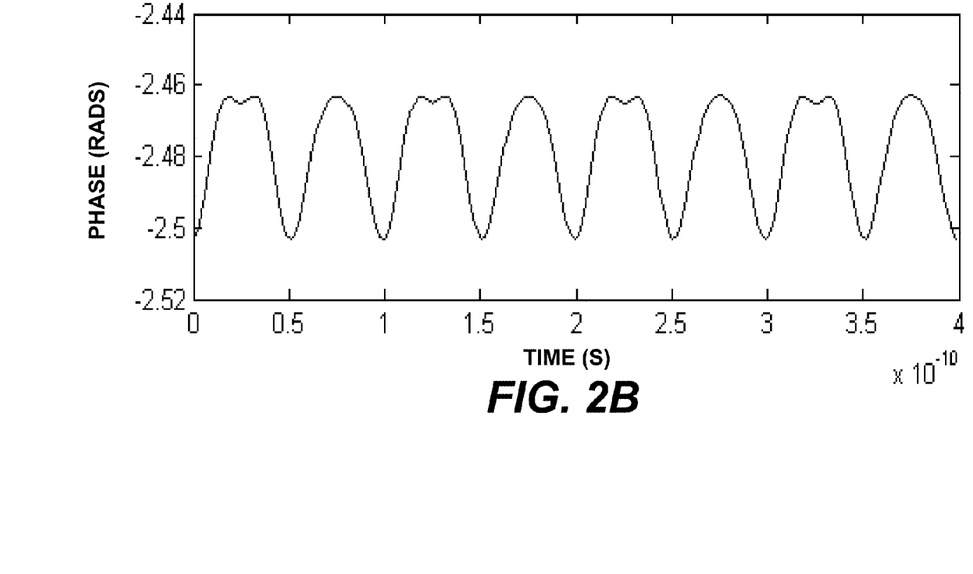

FIGS. 2A and 2B show the amplitude and phase, respectively, of a substantially chirp-free pulse train generated by the generator 110. The pulse train shown has an extinction ratio of approximately 13 dB.

Figure 3A:
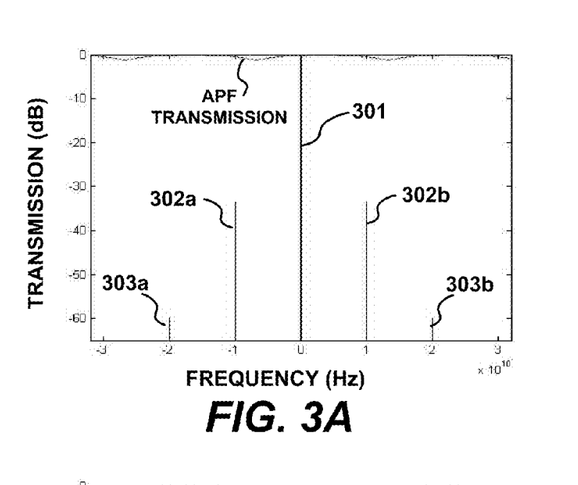
FIGS. 3A through 3D show the change in transmissivity and phase of an all-pass filter (APF) as a function of frequency and the output of a plasma dispersion phase modulator (PDPM) in the system of FIG. 1.
Figure 3B:
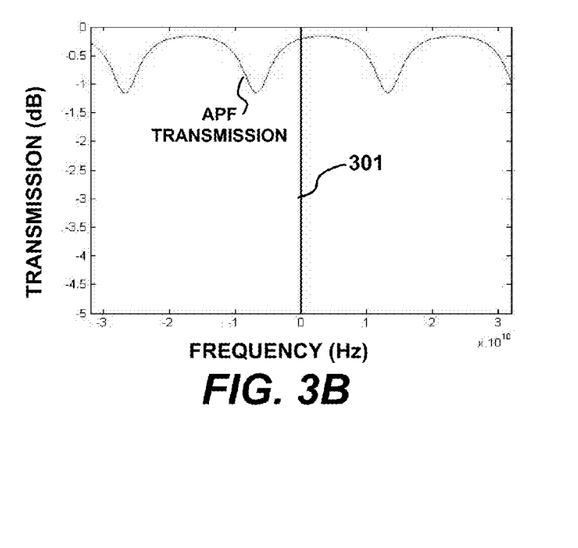
Figure 3C:
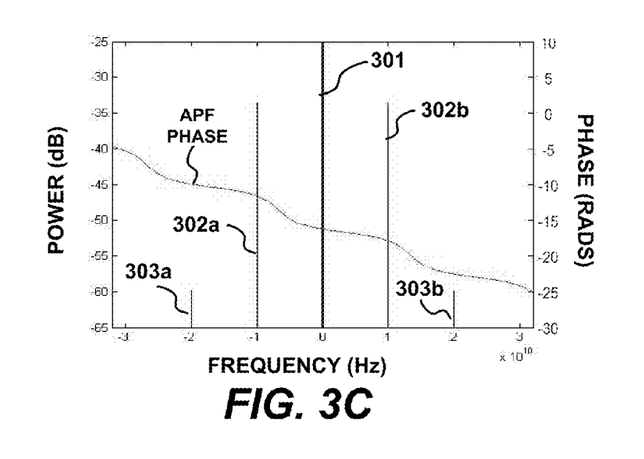
Figure 3D:
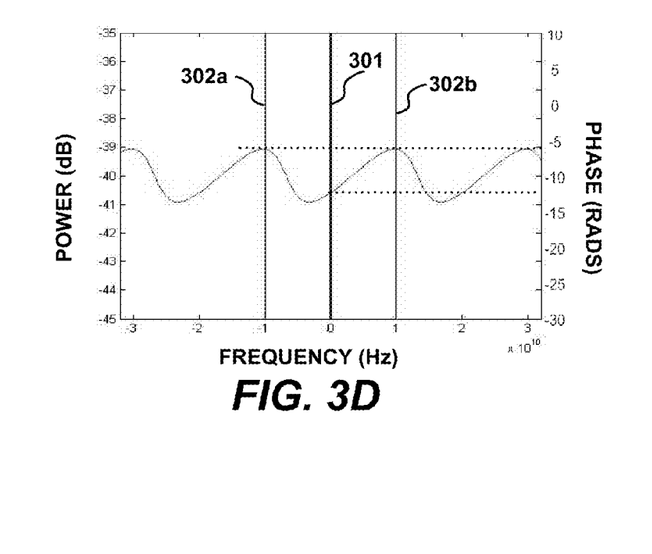

FIGS. 3A and 3B show the spectral response of the APF 112, with FIG. 3B having an expanded vertical scale. The output spectrum of the PDPM 111 is also shown in FIG. 3A. The output of the PDPM 111 shown in FIG. 3A can be described as including the carrier wavelength—represented by the tallest vertical line 301 in the center of FIG. 3A—and the modulation sidebands due to the modulation imparted by the PDPM 111, represented by the shorter vertical lines 302a,b and 303a,b on either side of line 301. FIG. 3C shows the variation of the phase of the APF 112 with frequency with the PDPM output superimposed. The linear component of the change in the APF 112 phase response with frequency is due to a constant group delay component from the APF 112. FIG. 3D shows the frequency dependent change in optical phase caused by the APF 112 with the linear component of the phase change removed for clarity, which corresponds to removing the constant group delay component. As shown in FIG. 3D, the APF 112 subjects the modulation sideband tones 302a,b to a phase shift of approximately 8 radians (or ~1.5 radians) relative to the carrier tone 301.

Figure 4A:
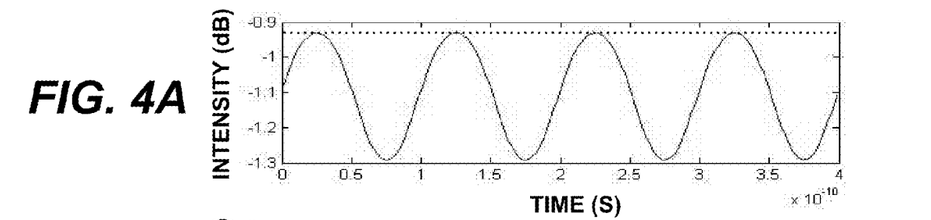
FIGS. 4A and 4B show the amplitude and phase, respectively, of the output of the PDPM.
Figure 4B:
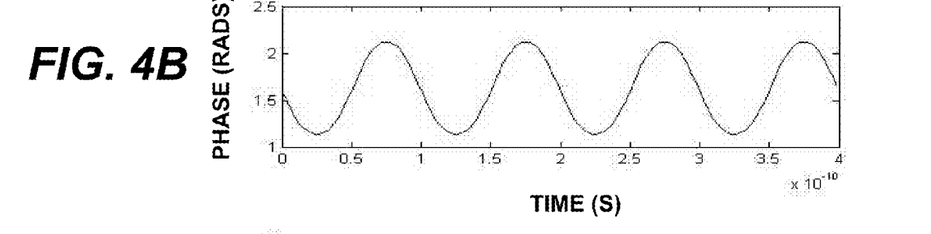
Figure 4C:
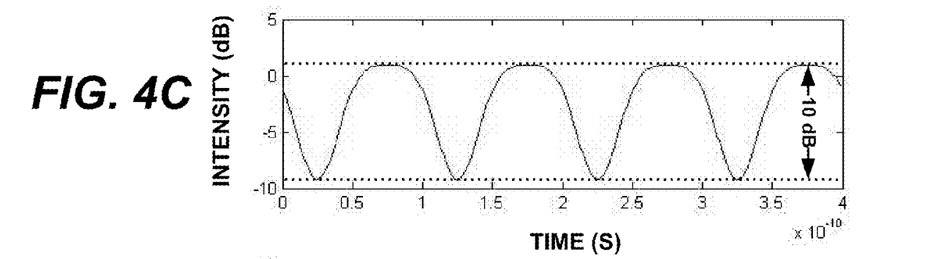
FIGS. 4C through 4E show the intensity and phase of a signal at the output of the APF.
Figure 4D:
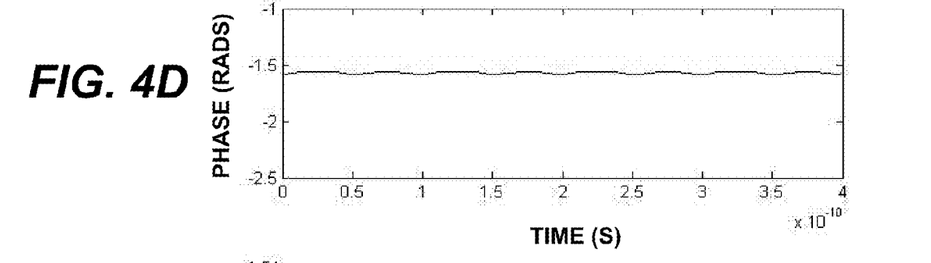
Figure 4E:
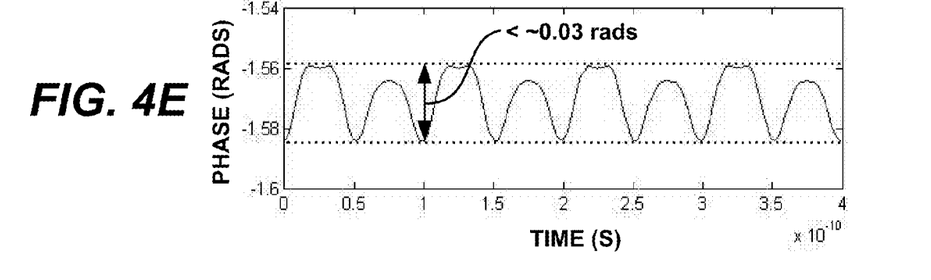

FIGS. 4A and 4B show the amplitude and phase, respectively, of the output of the PDPM 111. As shown, the CW light is predominantly phase modulated with some amplitude modulation (~0.35 dB). The peak intensity after the modulator 111 is approximately −0.9 dB. FIG. 4C shows the signal at the output of the APF 112, which has a peak intensity of approximately +1 dB. The phase of the APF output signal is shown in FIG. 4D and on an expanded scale in FIG. 4E. Note that the phase variation is less than approximately 0.03 radians.

Figure 5A:
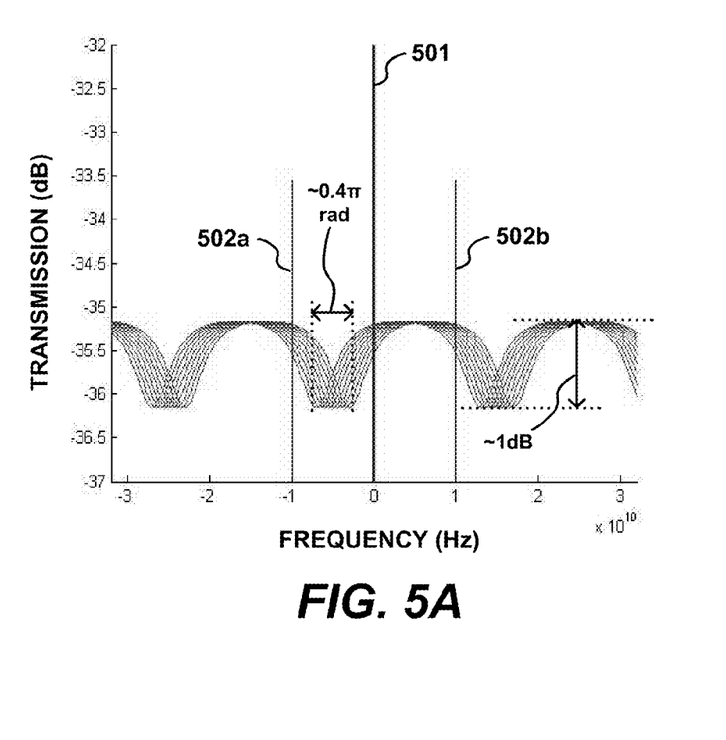
FIGS. 5A through 5C illustrate the minimal extinction ratio variation and chirp arising from a given variation in the spectral response of the APF in the case of a pulse train with an extinction ratio of approximately 10 dB.

FIG. 5A shows a plot of the frequency-dependent response of the APF 112 shifted over a given frequency range, in this illustration 0.4π radians (4 GHz), or 20% of the FSR (20 GHz) of the APF. The spectrum of the output of the PDPM 111 is also shown thereon as represented by spectral lines 501 and 502a,b. As shown in FIG. 5A the APF 112 is tuned so that the carrier wavelength 501 is located near, but off of a resonance of the APF response. Similarly, the sidebands 502a,b are also set to an off-resonance condition and so like the carrier 501 experience minimal loss through the APF 112. As shown in FIG. 5A, the maximum on-resonance loss of the APF is approximately 1 dB. As such, the primary filtering introduced by the APF 112 entails the frequency-dependent optical phase shifting of the phase modulated output of the PDPM 111 rather than any frequency-dependent optical loss. Note in FIG. 5A that the resonances in the spectral response of the APF 112 remain between the spectral components 501 and 502a,b as the spectral response of the APF 112 is shifted over the 0.4π radian range shown.

Figure 5B:
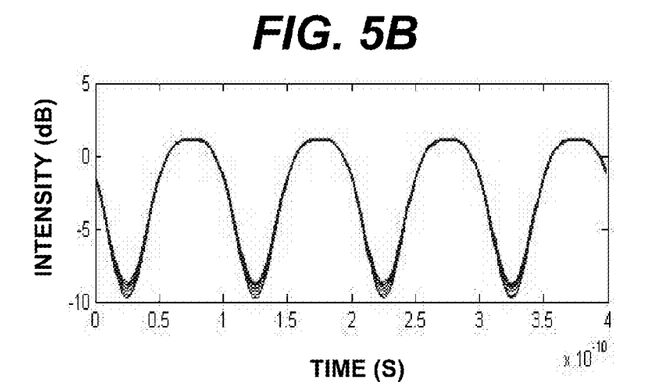
Figure 5C:
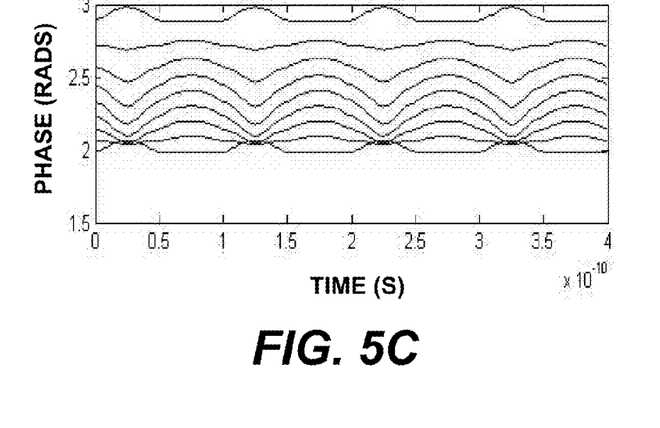

FIGS. 5B and 5C show the corresponding intensity and phase of the APF output signal over time. As shown in FIG. 5B, the pulse extinction ratio varies from approximately 9.9 dB to 10.8 dB when the spectral response of the APF is moved ~0.4π radians, or 20% of the filter FSR, demonstrating that the pulse extinction ratio is substantially insensitive to the spectral locations of the APF resonances. Also, as shown in FIG. 5C, when the APF spectral response is shifted 0.4π radians, the phase variation across each pulse remains less than approximately 0.2 radians (or approximately 12 degrees), which translates into a chirp of approximately ±1 GHz. This corresponds to a Mach-Zehnder Modulator (MZM) chirp parameter of approximately 0.2, which is a relatively small phase variation compared to the approximately 40 degree phase variation (±3.4 GHz) seen from a typical 0.7 chirp parameter LiNbO$_3$ MZM with a 10 dB pulse extinction ratio.

Figure 6A:
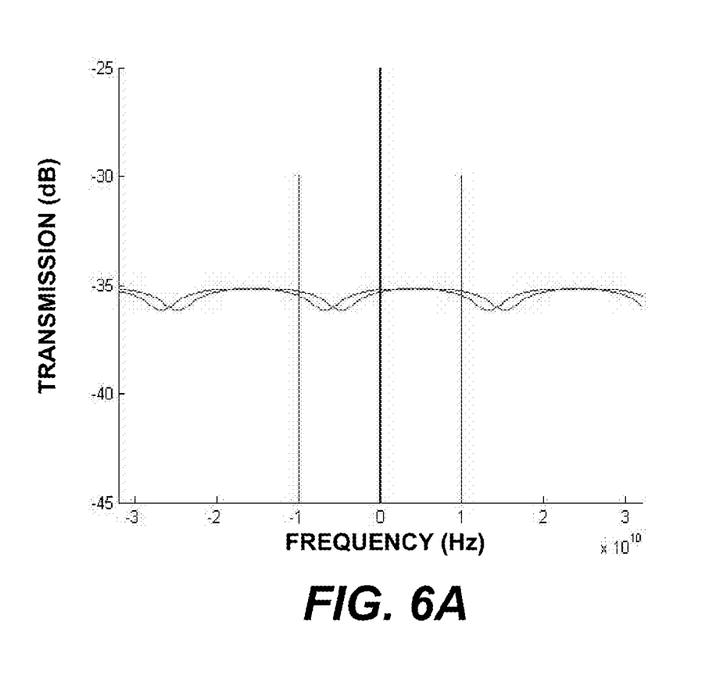
FIGS. 6A through 6C illustrate the tunable change in chirp arising from a variation in the spectral response of the APF in the case of a pulse train with an extinction ratio of approximately 20 dB.
Figure 6B:
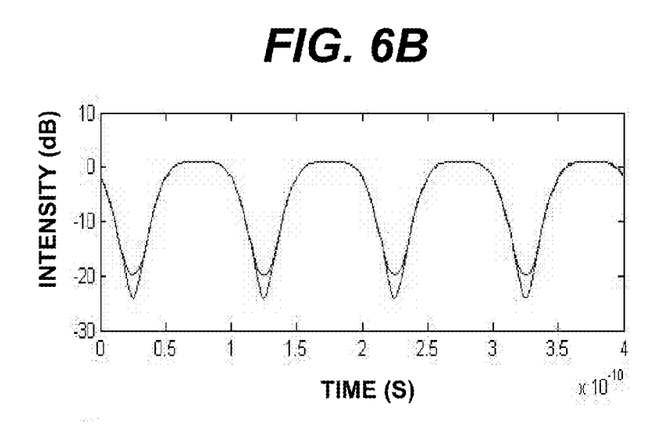
Figure 6C:
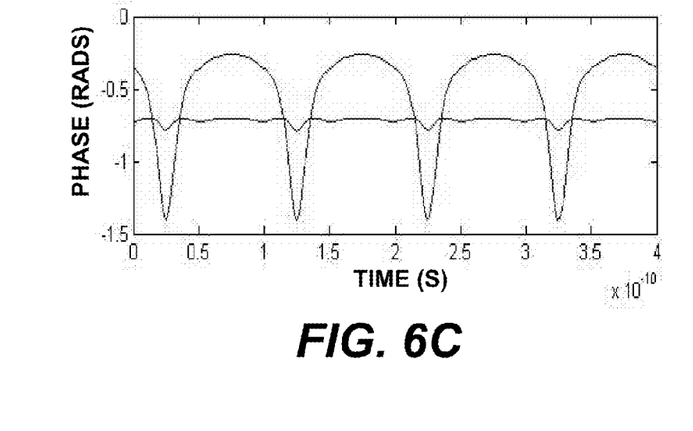

FIG. 6A shows a plot of the frequency response of the APF 112 shifted over a given range (~0.2π radians, or 10% of the filter FSR) in the case of a pulse extinction ratio of approximately 20 dB. The spectrum of the output of the PDPM 111 is also shown thereon. FIGS. 6B and 6C show the corresponding intensity and phase spectra of the APF output signal. As shown, the pulse extinction ratio remains greater than 20 dB while the effective chirp factor changes from being negligible to a value of approximately 0.7 (similar to that from a chirped LiNbO$_3$ MZM) by changing only the spectral location of the APF spectral response.

Figure 7A:
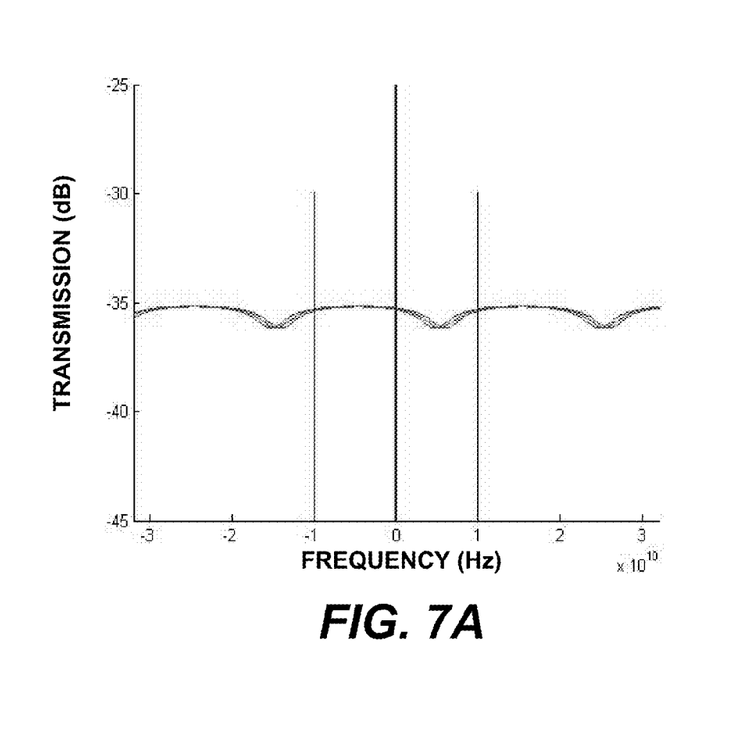
FIGS. 7A through 7C illustrate the ability to generate an opposite chirp from a variation in the spectral response of the APF in the case of a pulse train with an extinction ratio of approximately 20 dB.
Figure 7B:
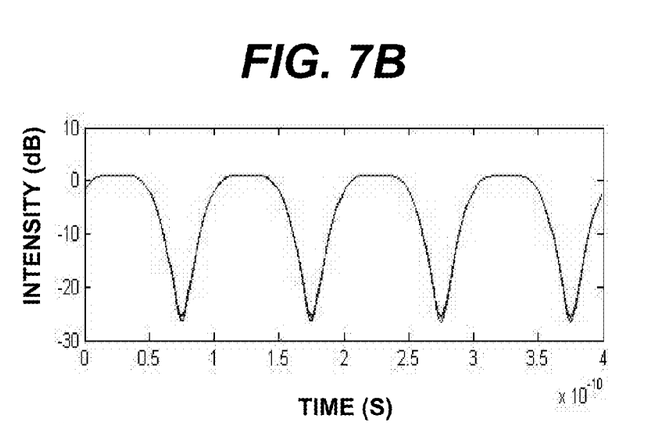
Figure 7C:
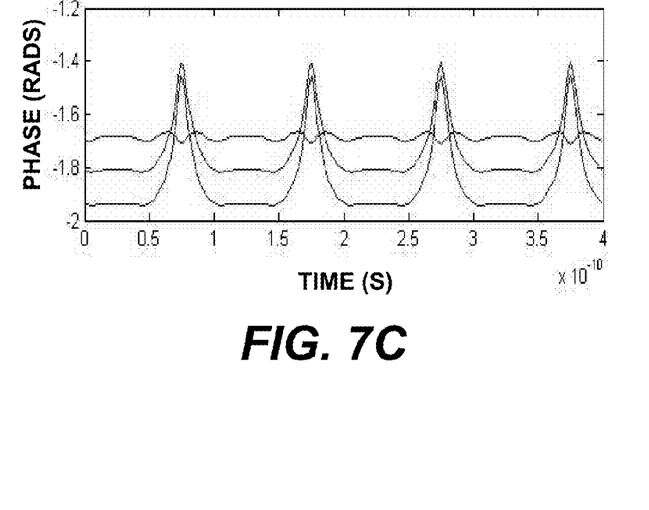

FIGS. 7A through 7C illustrate the same case as in FIGS. 6A-6C, except that the opposite chirp on pulses is demonstrated. Compare the relative locations of the APF resonances and the phase modulator output spectrum with those shown in FIG. 6A. The generator of the present invention can thus generate pulses with positive or negative chirp by tuning the APF 112 to shift the spectral response of the APF over a frequency range.

Because off-resonance filtering is used (i.e., the APF resonance frequencies or the frequencies at the bottoms of the dips in the APF spectral response are different from the frequencies of the spectral components of the PDPM output), the pulse generator extinction ratio is insensitive to the spectral position of the APF resonance: e.g., the resonance can be moved 20% of the FSR with little change in the pulse extinction ratio. Thus for a 10 dB pulse extinction ratio, the chirp remains small when the APF resonance is moved 20% of the FSR. For a 20 dB pulse extinction ratio, the chirp can be tuned from a negligible amount to an effective chirp factor of ~0.7, by changing only the spectral location of the APF resonance.

An exemplary embodiment of a 10 GHz pulse generator in accordance with the present invention was simulated with favorable results. In the simulation, the PDPM 111 had a length of approximately 3.3 mm and doping of approximately 1e17. The APF 112 had an FSR of 20 GHz, and a round trip loss of ~0.22 dB, with an assumed passive waveguide loss of 1.5 dB.

The RF power required to create a pulse train with a given extinction ratio was comparable to an MZM. For instance, for a 10 dB extinction ratio, the phase modulator drive voltage required is ~31% of V$\pi$ as opposed to ~32% for a push-pull MZM. For a 12 dB extinction ratio, the required voltage is ~35% of V$\pi$ compared to ~36% for a push-pull MZM, and for a 15 dB extinction ratio, ~39% of V$\pi$, as opposed to ~40.5% for a push-pull MZM.

Figure 8A:
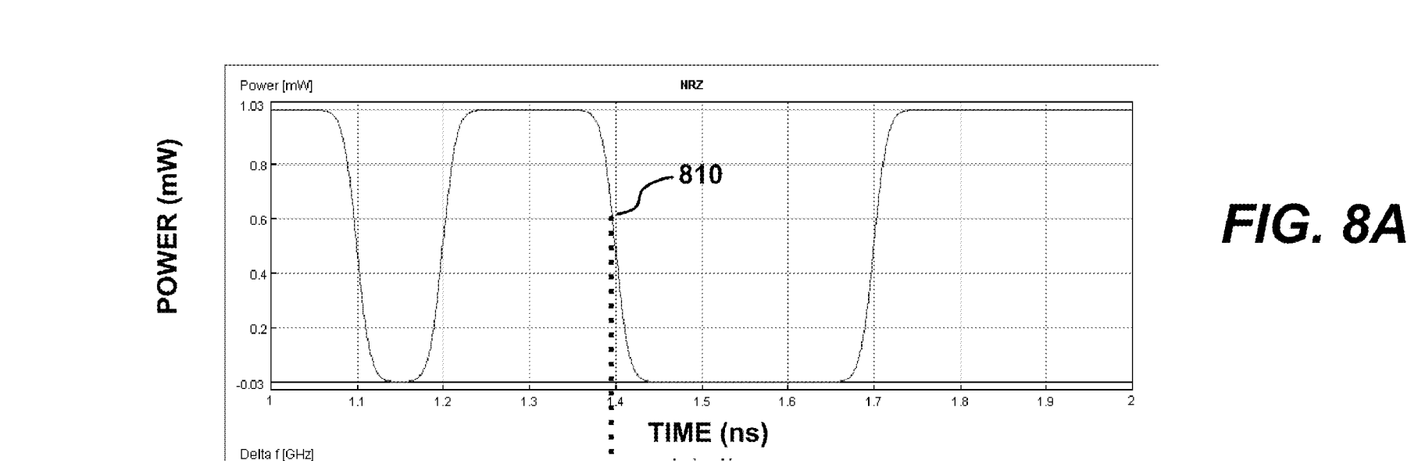
FIGS. 8A and 8B illustrate the occurrence of chirp in a chirped non-return-to-zero (NRZ) data-modulated signal generated by a chirped data modulator.
Figure 8B:
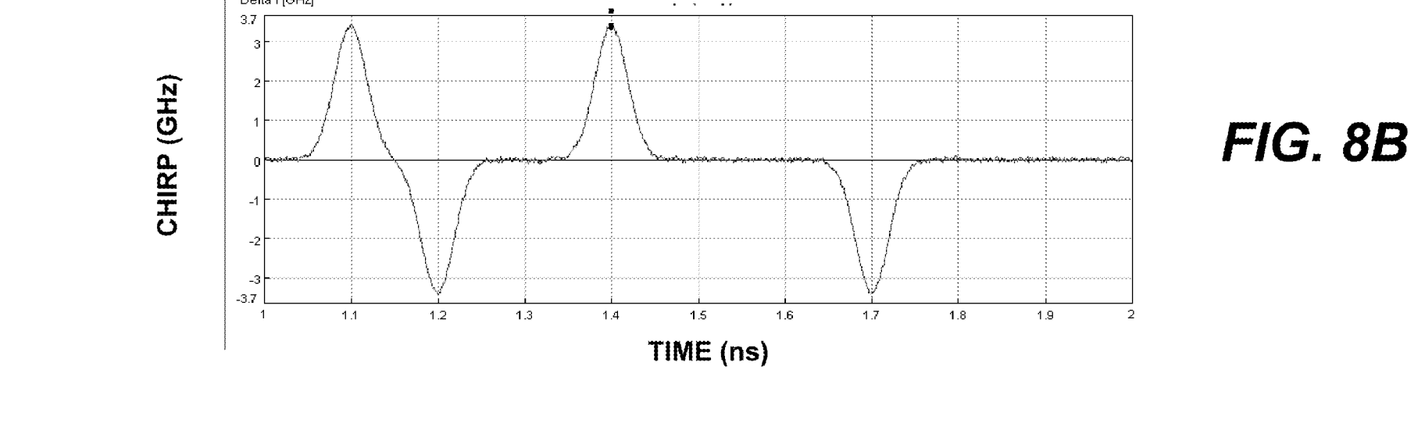

FIGS. 8A and 8B illustrate the occurrence of chirp in a chirped non-return-to-zero (NRZ) data-modulated signal generated by a chirped data modulator, such as the modulator 120 shown in FIG. 1. (Note that in this case, the signal shown is generated by the modulator 120 operating alone, without receiving pulses from the pulse generator 110.) The chirp is manifested as a change in color at the leading and trailing edges of each NRZ pulse. As shown in FIGS. 8A and 8B, maximum chirp occurs at approximately 60% of peak power of the NRZ pulse stream, as represented by point 810.

Figure 9A:
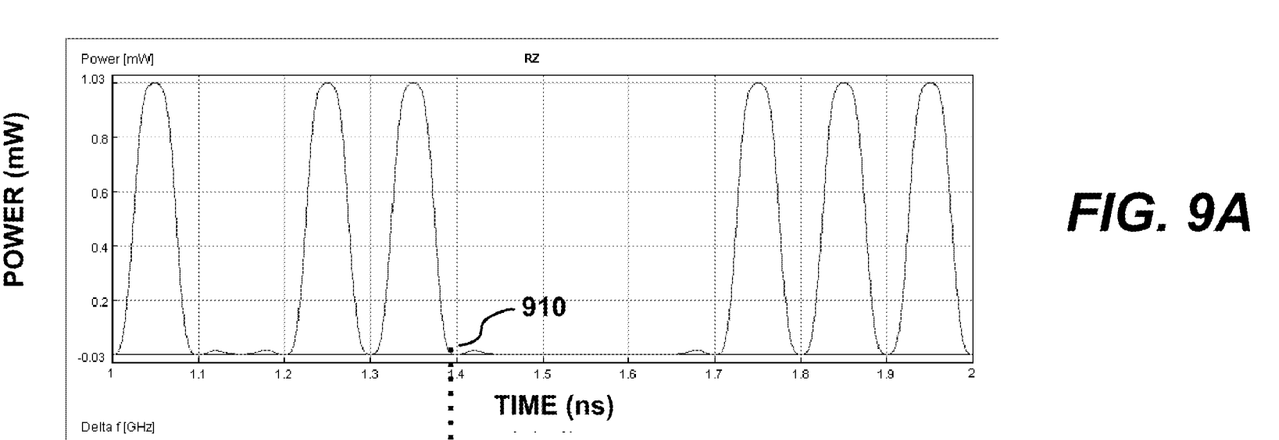
FIGS. 9A and 9B illustrate the occurrence of chirp in a minimal-chirp return-to-zero (RZ) signal generated by the data modulator system of FIG. 1.
Figure 9B:
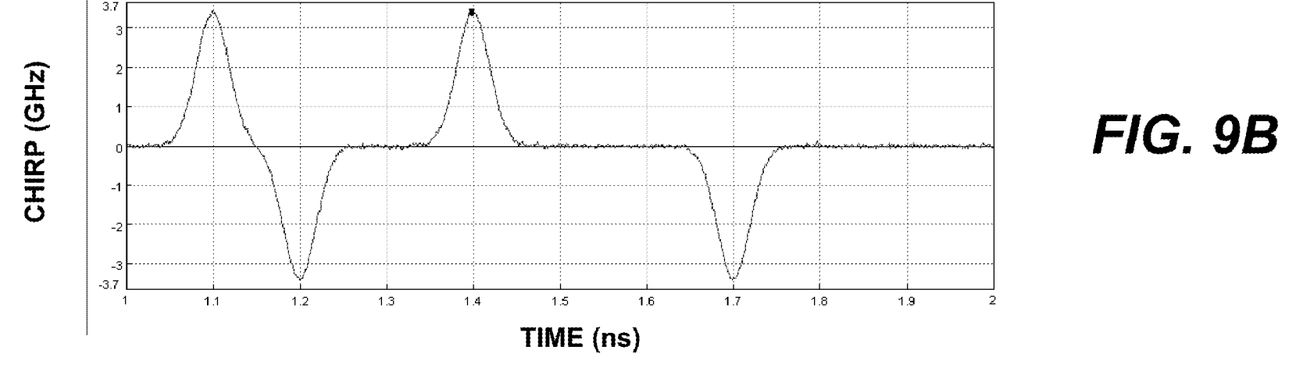

FIGS. 9A and 9B illustrate the occurrence of chirp in a minimal-chirp return-to-zero (RZ) signal generated by an exemplary embodiment of a data modulator system in accordance with the present invention, such as the system 100 of FIG. 1. As shown in FIGS. 9A and 9B, maximum chirp occurs at approximately 0% of peak power of the RZ pulse stream, as represented by point 910. Since the signal power is at or near zero when the chirp is maximum, the manifestation of the chirp in the RZ signal will be minimal, thus yielding an effectively chirp-free signal.

It is understood that the above-described embodiments are illustrative of only a few of the possible specific embodiments which can represent applications of the invention. Numerous and varied other arrangements can be made by those skilled in the art without departing from the spirit and scope of the invention.

What is claimed is:

1. An optical pulse generator comprising:
   a phase modulator, wherein the phase modulator is a plasma dispersion phase modulator (PDPM) configured to phase modulate a continuous wave (CW) light signal in accordance with a received electrical signal; and
   an all-pass filter, the all-pass filter being coupled to the phase modulator to generate a pulsed light signal by filtering the modulated light signal from the phase modulator, wherein the all-pass filter has a tunable spectral response, and the pulsed light signal has a chirp factor that varies in accordance with a spectral location of a resonance in the spectral response of the all-pass filter.

2. The optical pulse generator of claim 1, wherein the pulsed light signal is substantially chirp-free.

3. The optical pulse generator of claim 1, wherein the pulsed light signal has a chirp factor $\leq \pm 0.2$.

4. The optical pulse generator of claim 1, wherein the modulated signal from the phase modulator has a chirp.

5. The optical pulse generator of claim 1, wherein the phase modulator includes at least one of silicon, germanium, and indium phosphide material.

6. The optical pulse generator of claim 1, wherein the all-pass filter comprises:
   a coupler; and
   a phase shifter,
   wherein the coupler and phase shifter are arranged in a waveguide ring.

7. The optical pulse generator of claim 6, wherein the coupler is a thermo-optic tunable coupler and the phase shifter is a thermo-optic phase shifter.

8. The optical pulse generator of claim 1, wherein a frequency of a resonance in a spectral response of the all-pass filter and a frequency of a spectral component of the modulated light signal are different.

9. The optical pulse generator of claim 1, wherein a peak power of the pulsed light signal is greater than a peak power of the CW light signal.

10. A data modulator system comprising the optical pulse generator of claim 1 and a chirped intensity modulator.

11. The data modulator system of claim 10, wherein the chirped intensity modulator includes at least one of a Mach-Zehnder modulator and an electro-absorption modulator.

12. The data modulator system of claim 10, wherein the chirped intensity modulator includes at least one of silicon, germanium, and indium phosphide material.

13. The data modulator system of claim 10, wherein the chirped intensity modulator generates a data modulated optical signal that is effectively chirp-free.

14. The data modulator system of claim 11, wherein the Mach-Zehnder modulator includes:
   a first coupler;
   a phase shifter;
   a first phase modulator;
   a second phase modulator; and
   a second coupler,
   wherein:
      the first phase modulator is coupled between a first output of the first coupler and a first input of the second coupler, and
      the phase shifter and the second phase modulator are coupled in series between a second output of the first coupler and a second input of the second coupler.

* * * * *